United States Patent
Peeters et al.

(10) Patent No.: US 7,949,560 B2
(45) Date of Patent: *May 24, 2011

(54) SYSTEM AND METHOD FOR PROVIDING PRINT ADVERTISEMENTS

(75) Inventors: Eric Peeters, Fremont, CA (US); Richard H. Bruce, Los Altos, CA (US); Ana Arias, San Carlos, CA (US); Bo Begole, San Jose, CA (US); Ross Bringans, Cupertino, CA (US); Celia Chow, Palo Alto, CA (US); Lawrence Lee, Menlo Park, CA (US); Lisa Fahey, San Francisco, CA (US); Linda Jacobson, Half Moon Bay, CA (US); Marc Mosko, Santa Cruz, CA (US); Susan (Susie) Mulhern, Gilroy, CA (US); Nitin Parekh, Los Altos, CA (US); David Weinerth, Oakland, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 760 days.

This patent is subject to a terminal disclaimer.

(21) Appl. No.: 11/818,327

(22) Filed: Jun. 13, 2007

(65) Prior Publication Data
US 2008/0313035 A1 Dec. 18, 2008

(51) Int. Cl.
*G06Q 30/00* (2006.01)
(52) U.S. Cl. ............... 705/14.39; 705/14.49; 705/14.71
(58) Field of Classification Search ............... 705/14.49, 705/14.71, 10, 319, 14.39
See application file for complete search history.

(56) References Cited

U.S. PATENT DOCUMENTS

| | | | |
|---|---|---|---|
| 5,621,812 A * | 4/1997 | Deaton et al. ................. | 382/100 |
| 5,710,886 A * | 1/1998 | Christensen et al. ...... | 705/14.26 |
| 5,948,061 A | 9/1999 | Merriman et al. | |
| 6,144,944 A | 11/2000 | Kurtzman, II et al. | |
| 6,269,361 B1 | 7/2001 | Davis et al. | |
| 6,324,519 B1 | 11/2001 | Eldering | |
| 6,404,994 B1 * | 6/2002 | Kawai et al. ...................... | 399/6 |
| 6,615,251 B1 | 9/2003 | Klug et al. | |
| 6,731,393 B1 * | 5/2004 | Currans et al. ............... | 358/1.12 |
| 6,735,572 B2 * | 5/2004 | Landesmann .............. | 705/14.39 |
| 6,826,534 B1 * | 11/2004 | Gupta et al. ...................... | 705/8 |
| 6,873,424 B2 | 3/2005 | Jakobsson et al. | |
| 6,891,635 B2 | 5/2005 | Dutta | |
| 6,915,271 B1 * | 7/2005 | Meyer et al. ................ | 705/14.35 |
| 6,928,620 B1 * | 8/2005 | Crangle et al. ................ | 715/769 |
| 6,972,861 B1 * | 12/2005 | van Zee et al. ............... | 358/1.15 |
| 6,980,311 B1 * | 12/2005 | Currans et al. ............... | 358/1.15 |
| 6,981,214 B1 | 12/2005 | Miller et al. | |
| 6,999,190 B2 | 2/2006 | Shimbori et al. | |

(Continued)

OTHER PUBLICATIONS

E. Meyer, "CSS Design: Going to Print," http://alistapart.com/stories/goingtoprint (May 2002).

(Continued)

*Primary Examiner* — John G Weiss
*Assistant Examiner* — Adam Chornesky
(74) *Attorney, Agent, or Firm* — Patrick J.S. Inouye

(57) ABSTRACT

A system and method for providing print advertisements is presented. A target audience is assembled from characteristics about readers. Advertising content is targeted to the target audience. The characteristics of the target audience are analyzed against the advertising content to identify potential advertisers. At least one of the potential advertisers is selected. At least one print advertisement for the selected advertiser is included on the document.

36 Claims, 10 Drawing Sheets

U.S. PATENT DOCUMENTS

| | | | |
|---|---|---|---|
| 7,025,346 B1* | 4/2006 | Currans et al. | 271/147 |
| 7,038,796 B1* | 5/2006 | Gupta et al. | 358/1.15 |
| 7,038,799 B2* | 5/2006 | Laursen et al. | 358/1.15 |
| 7,065,497 B1* | 6/2006 | Brewster et al. | 705/14.61 |
| 7,079,712 B1 | 7/2006 | Silverbrook et al. | |
| 7,085,732 B2 | 8/2006 | Gould | |
| 7,089,194 B1 | 8/2006 | Berstis et al. | |
| 7,120,235 B2* | 10/2006 | Altberg et al. | 379/114.13 |
| 7,130,807 B1 | 10/2006 | Mikurak | |
| 7,136,177 B1* | 11/2006 | Bryan et al. | 358/1.15 |
| 7,136,178 B1* | 11/2006 | Gupta et al. | 358/1.15 |
| 7,143,055 B1* | 11/2006 | Perkowski | 705/26 |
| 7,181,438 B1* | 2/2007 | Szabo | 1/1 |
| 7,266,509 B2 | 9/2007 | Koenig | |
| 7,409,362 B2* | 8/2008 | Calabria | 705/26 |
| 7,444,658 B1 | 10/2008 | Matz et al. | |
| 7,455,586 B2 | 11/2008 | Nguyen et al. | |
| 7,502,995 B2 | 3/2009 | Takagi et al. | |
| 7,505,925 B2 | 3/2009 | Turner et al. | |
| 7,519,548 B2 | 4/2009 | Hanechak et al. | |
| 7,529,829 B2 | 5/2009 | Kaneko et al. | |
| 7,606,741 B2 | 10/2009 | King et al. | |
| 7,657,458 B2* | 2/2010 | Calabria | 705/26 |
| 7,660,581 B2* | 2/2010 | Ramer et al. | 455/432.3 |
| 7,730,509 B2 | 6/2010 | Boulet et al. | |
| 2001/0049620 A1 | 12/2001 | Blasko | |
| 2002/0053076 A1* | 5/2002 | Landesmann | 725/10 |
| 2003/0053102 A1* | 3/2003 | Kelsey | 358/1.13 |
| 2003/0083932 A1* | 5/2003 | Wolf et al. | 705/14 |
| 2005/0010475 A1* | 1/2005 | Perkowski et al. | 705/14 |
| 2005/0096980 A1* | 5/2005 | Koningstein | 705/14 |
| 2005/0144072 A1* | 6/2005 | Perkowski et al. | 705/14 |
| 2005/0144073 A1 | 6/2005 | Morrisroe et al. | |
| 2005/0149397 A1* | 7/2005 | Morgenstern et al. | 705/14 |
| 2005/0288954 A1 | 12/2005 | McCarthy et al. | |
| 2006/0015406 A1 | 1/2006 | Beyda et al. | |
| 2006/0143067 A1* | 6/2006 | Calabria | 705/10 |
| 2006/0143068 A1* | 6/2006 | Calabria | 705/10 |
| 2006/0212350 A1* | 9/2006 | Ellis et al. | 705/14 |
| 2006/0212354 A1* | 9/2006 | Wolf et al. | 705/14 |
| 2006/0282319 A1 | 12/2006 | Maggio | |
| 2006/0287916 A1* | 12/2006 | Starr et al. | 705/14 |
| 2007/0011050 A1* | 1/2007 | Klopf et al. | 705/14 |
| 2007/0106551 A1* | 5/2007 | McGucken | 705/10 |
| 2007/0121843 A1* | 5/2007 | Atazky et al. | 379/114.13 |
| 2007/0124248 A1* | 5/2007 | Stoker | 705/51 |
| 2007/0162296 A1 | 7/2007 | Altberg et al. | |
| 2007/0198341 A1* | 8/2007 | Park | 705/14 |
| 2007/0203903 A1* | 8/2007 | Attaran Rezaei et al. | 707/5 |
| 2007/0214079 A1* | 9/2007 | Mears | 705/39 |
| 2007/0214097 A1 | 9/2007 | Parsons et al. | |
| 2007/0271138 A1 | 11/2007 | Van Der Linden et al. | |
| 2007/0299694 A1 | 12/2007 | Merck | |
| 2008/0033776 A1 | 2/2008 | Marchese | |
| 2008/0046499 A1 | 2/2008 | Cabrera et al. | |
| 2008/0059297 A1* | 3/2008 | Vallier et al. | 705/14 |
| 2008/0082415 A1* | 4/2008 | Shastry | 705/14 |
| 2008/0097837 A1* | 4/2008 | Jacobson | 705/14 |
| 2008/0262901 A1* | 10/2008 | Banga et al. | 705/10 |
| 2008/0313035 A1* | 12/2008 | Peeters et al. | 705/14 |
| 2008/0313036 A1* | 12/2008 | Mosko et al. | 705/14 |
| 2009/0077658 A1 | 3/2009 | King et al. | |
| 2009/0154810 A1 | 6/2009 | Enomoto et al. | |
| 2010/0257037 A1 | 10/2010 | Matz et al. | |
| 2010/0306034 A1* | 12/2010 | Stein et al. | 705/10 |

OTHER PUBLICATIONS

E. Meyer, "Print Different," http://meyerweb.com/eric/articles/webrev/200001.html (Jan. 2000).

* cited by examiner

SYSTEM AND METHOD FOR PROVIDING
PRINT ADVERTISEMENTS

FIELD

This application relates in general to print advertising and, in particular, to a system and method for providing print advertisements.

BACKGROUND

Print advertising is most effective when viewed by readers who would likely have an interest in the products or services being advertised. Print advertising in newspapers, for example, is typically directed to readers that are demographically identified by region, whereas print advertising in magazines and periodicals often relates to the publication's subject matter or theme.

Advertising is generally intended to create an interest in or to generate an awareness of products or services, and effectively targeting print advertising includes knowing the characteristics of the intended readership to ensure that the advertisements are both topical and eye-catching. A priori knowledge of a readership's characteristics may be difficult to gauge where the readership is a small audience, or where document content is uncertain until the time of publication, such as with limited circulation publications or personal printing.

One reason that advertising to a small audience remains difficult is that "short run" printing is relatively closed-ended and most advertisers lack access to the readership. Without access, advertisers can neither determine the readers' characteristics for effectively targeting advertising, nor physically place print advertisements in the documents. Moreover, the costs of advertising can disfavor small merchants and revenue potentially gained may not justify the cost of the undertaking, especially where the small merchants must compete against larger and better known competitors.

Even where access to the readership is available, an inability to obtain characteristics and demographics beyond any information already voluntarily disclosed can hinder advertisement targeting. For instance, the specter of identity theft and fear of receiving "junk" mail can undermine the willingness of individuals to divulge their personal information to third parties. Thus, the targeting of print advertising to small audience markets can be a gamble when little information about the readerships' characteristics is known with certainty.

Conventionally, Google, Inc., Mountain View, Calif., offers a targeted Web advertising program called AdSense. The pages for customers' Websites are automatically crawled and advertisements are placed in the margins based on the audience and Web page content. Customers are paid whenever visitors to their Website click on the placed advertisements and the potential for receiving advertising revenue provides an incentive for customers to allow targeted advertising. However, the incentives are limited to Web-displayable content and are unavailable to publishers of short printing runs or individual printing.

U.S. Pat. No. 6,269,361, issued Jul. 31, 2001 to Davis et al. discloses matching search results to advertiser Web pages by matching words parsed from user search queries, the disclosure of which is incorporated by reference. The positions of entries for advertiser Web pages in the search listings are influenced through a continuous online competitive bidding process between the advertisers. A "click-through" payment model charges the advertisers, which is triggered when a user selects an advertiser Web page entry.

U.S. Pat. No. 6,891,635, issued May 10, 2005 to Dutta discloses a system and method for providing advertisements in Web-based printing in which a remote printing Web server receives advertisements from one or more advertisers, the disclosure of which is incorporated by reference. The advertisements can include target audience attributes. A print user connects to the remote printing Web server and information about the user is gathered to match the user with appropriate advertisements. Advertisements are identified and combined with a document that the user wishes to print. The printer hosting site is paid by the advertisers for including their advertisements in printouts. However, the advertising is selected only by user-provided information and not document content. Nor is the user-provided information advantageously "mined" to generate targeted information, which could be provided to social groups, such as clubs, and other organizations that have a potentially shared interest. Moreover, the advertising is provided for paying advertisers who are not competitively selected.

U.S. Pat. No. 7,065,497, issued Jun. 20, 2006 to Brewster et al. discloses a system and method for automatically printing a document without user intervention, the disclosure of which is incorporated by reference. A user profile, which stores information about the document recipient, such as name, email address, household income, and interests, is stored and updated when a document is printed. The user profile can be used to select information or advertising likely to be of interest to the user to be included in the document. A product can be subsidized for a user, such as a print consumable, based on the information contained in the user profile. However, the advertising is selected only by user profile information and not document content. Moreover, the advertising is provided for designated advertisers who are not competitively selected.

Therefore, there is a need for providing targeted print advertisement placement on documents printed for a small audience by incentivizing publishers and readers to divulge their characteristics and demographics and to permit the compensable placement of print advertisements on the documents thus produced.

SUMMARY

One embodiment provides a system and method for providing print advertisements. A target audience is assembled from characteristics about readers, including social characteristics gained indirectly through context or affiliation. Advertising content is targeted to the target audience. The characteristics of the target audience are analyzed against the advertising content to identify potential advertisers. At least one of the potential advertisers is selected. At least one print advertisement for the selected advertiser is included on the document.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Terms

As used herein, the term "print advertising" refers to advertisements and sponsored information, which can include text and visuals that are included on physically printed publications, such as books, periodicals, magazines, catalogs, newsletters, documents, and various forms of writings. The terms "document," "publication," and "writing" refer to written content that can be read or viewed and can include a complete work, an excerpt or portion of a writing, or any other textual or visual material that can be physically printed. In a further embodiment, the terms "document," "publication," and "writing" refer to also refer to written content that has been converted into an audio, video, or other form of multimedia, such as an audio book. Additionally, the terms "author," "creator," "writer," "contributor," and "publisher" refer to the originator of a document, and the terms "reader," "consumer," and "user" refer to the intended reader or viewer of a document or print advertising. As well, the terms "characteristics," "attributes," and "demographics" refer generally to information about readers, which enables print advertising to be targeted, either to the readers collectively or individually. The terms "printing" and "publishing" refer to the physically process of outputting a hardcopy document. Finally, although described with particular focus on advertising content, other types of non-advertising information and content could be provided. Each of the terms can be used interchangeably and, unless otherwise noted, will have similar meanings.

Print Advertising Environment

Providing effective print advertising to a small audience of readers, such as a social or special interest group or individuals with particular interests, can benefit by gaining access to the process of physically printing documents, which enables advertising targeting and placement to occur as part of the printing process. As well, obtaining access to the characteristics of the readership, although not obligatory, can further improve the effectiveness of the targeting of the print advertising, particularly where document content alone provides insufficient context for effective targeting.

Figure 1:
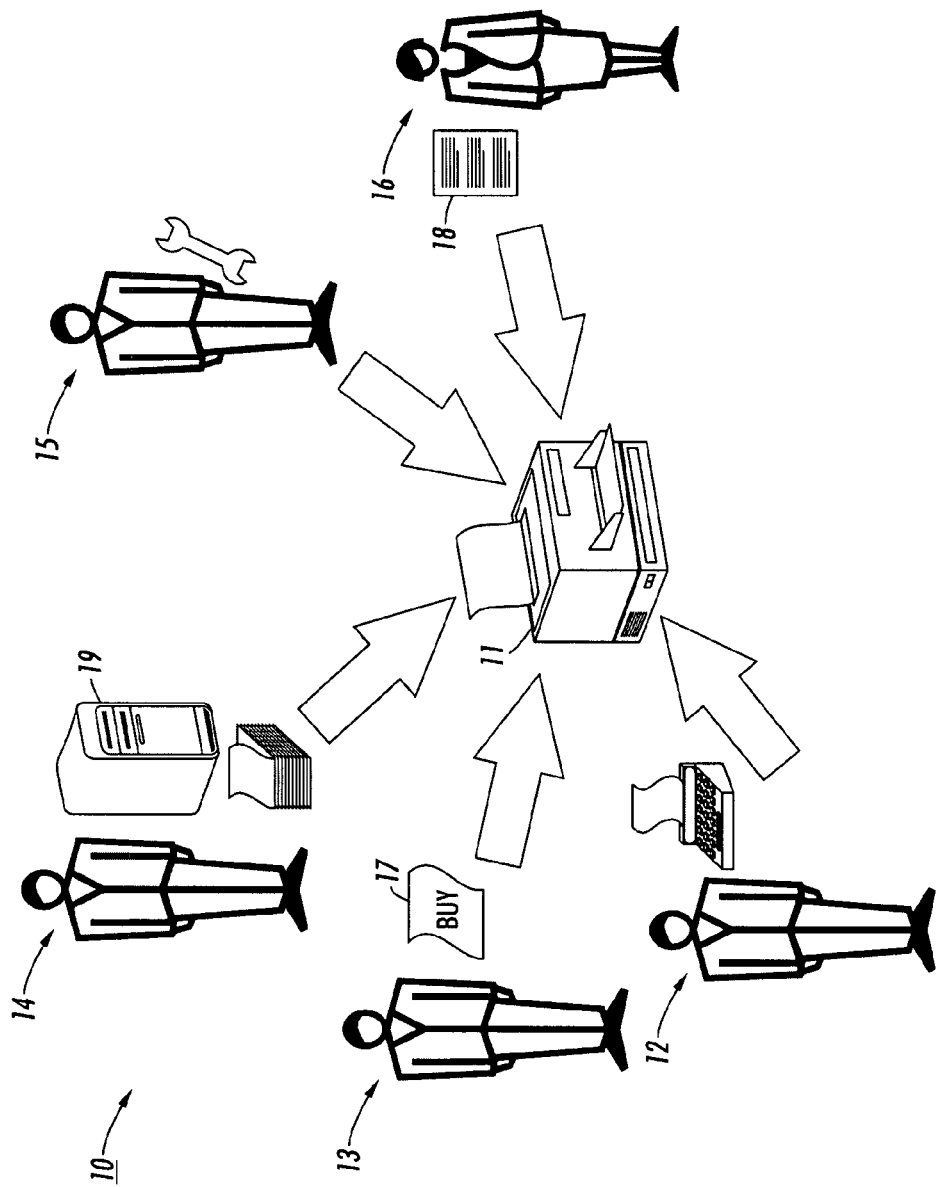
FIG. 1 is a functional block diagram showing a system for providing print advertisements in accordance with one embodiment.

In general, advertising placement on short printing runs, such as publications with limited circulation or for personal use, implicates the participation of five logical entities, although under some circumstances, many of the entities could actually be the same person or system, as further explained below. FIG. 1 is a functional block diagram showing a system 10 for providing print advertisements in accordance with one embodiment. A document publisher 12 writes or creates a new document, or accesses an existing document or other printable material, which can be physically printed by a document printer 15 on a printing device 11, and can be read or viewed by a document reader 16. The document publisher 12, document printer 15, and document reader 16 can be separate or combined entities, such as in the case of an individual writing and printing documents for personal use.

Ordinarily, an advertiser 13 that wants to target and place print advertising on documents would lack access to the physical printing process for a short printing run, particularly where the printing is by an individual. However, access can be provided through an electronic marketplace operator 14, who can directly or indirectly participate in the physical printing process and can provide print advertising on behalf of an advertiser 13, as further described below with reference to FIG. 2. The print advertising provisioning can be performed through manual selection, or by a machine, such as server 19, using rule-based or other selection processes. Briefly, the electronic marketplace operator 14 can target advertising content in the time interval between a printing request and physical printing, which is placed on the documents prior to actual printing. In further embodiments, the targeting of advertising content can be performed at other times.

Both the document 18 and advertising content 17 are stored in electronic form, which can be exchanged between computing and printing devices over a network, such as the Internet. The document publisher 12, who writes the document 18, and the document reader 16, who reads the document, have access to the document, either directly, such as in the form of a file or hardcopy, or indirectly, such as where a document publisher 12 contributes only a portion of the material that is included in the finished document 18. The advertiser 13 and electronic marketplace operator 14 can have full or restricted document access. For example, advertisers 13 may be limited to accessing only the characteristics or metadata about the document 18, which can be in the form of keywords, digests, or other forms of abstracted or summarized data. Similarly, the document printer 15 can have access to the document, as necessary for rendering as hardcopy on a printing device, either directly or indirectly.

Each computing device can be a personal computer, Web-enabled device, or other type of device designed for document perusal or composition. The printing device 11 can be a xerographic, flexographic press, offset press, laser, inkjet, daisy wheel, dot matrix, or other type of device designed to output hardcopy documents on paper or other physical human-readable media, particularly where the printing device is adapted to short printing runs. Other types of computing and printing devices are possible.

Print Advertising Process

Figure 2:
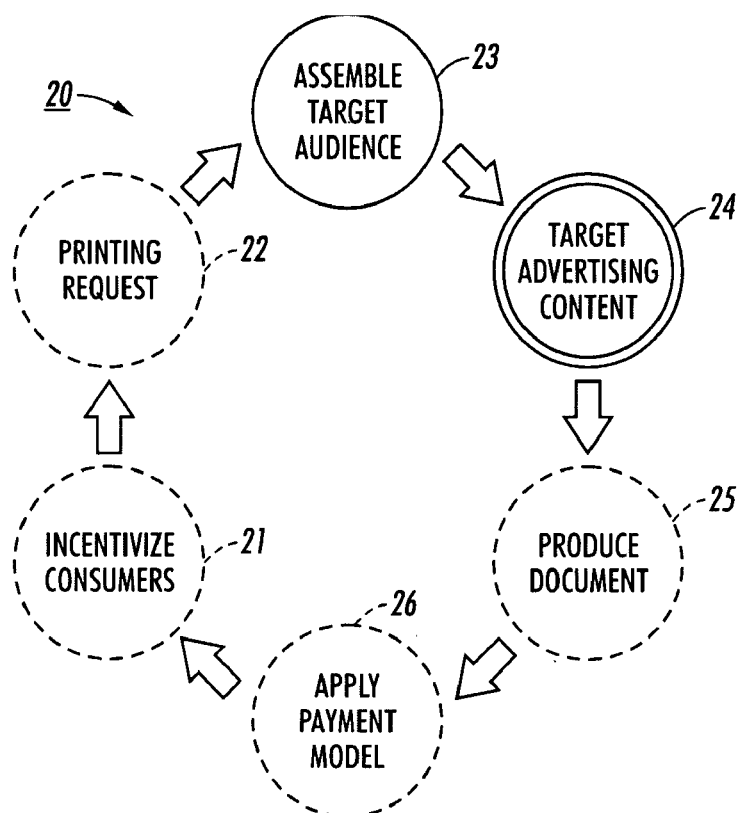
FIG. 2 is a process flow diagram showing a method for providing print advertisements in accordance with one embodiment.

The electronic marketplace operator 14 is responsible for orchestrating the targeting and placement of print advertising. In a further embodiment, the electronic marketplace operator 14 can also be responsible for document layout, content selection, production, and other publication-related services. FIG. 2 is a process flow diagram showing a method 20 for providing print advertisements in accordance with one embodiment. The method is performed as a series of process steps by general purpose programmable computing device, such as a server, personal computer, or other network-connectable device.

The electronic marketplace operator 14 is centrally located on a network, which is preferably a publicly-accessible network, such as the Internet. The document publisher 12, advertiser 13, document printer 15, and document reader 16 can interface to the electronic marketplace operator 14 via the network throughout the stages of print advertising targeting and placement, although the physical printing of documents with placed print advertising may actually be performed on the printing device 11 by a document printer 15 or document reader 16.

Advertising targeting and placement can occur in near real time, that is, during the time interval between a printing request and the physical printing of a document. In a further embodiment, advertising targeting and placement can be performed at other times, such as during document creation.

In a still further embodiment, advertising targeting and placement can occur through dual representation in both online and hardcopy mediums, such as further described in commonly-assigned U.S. patent application, entitled "System and Method for Providing Advertisements in Online and Hardcopy Mediums," Ser. No. 11/818,439, filed Jun. 13, 2007, pending, the disclosure of which is incorporated by reference. The respective Web and hardcopy advertisements that are targeted and placed need not be matching. Moreover, the payment models used, if any, could provide separate or consolidated payments to the Web-based advertising facilitators and electronic marketplace operator 14 as appropriate. Still other targeted advertising and placement approaches are possible.

During near real time targeting, the electronic marketplace operator 14 is initially notified of a printing request (operation 22), which triggers the assembling of a target audience of readers 16 that is based on their characteristics (operation 23). In a further embodiment, users can pre-select the types of print advertisements that they are willing to have included on their hardcopy, such as by making a selection during printing preview or program option selection. The pre-selections are used in place of dynamic advertising targeting.

The characteristics can be determined on-the-fly or over time by mining keywords or concepts directly from the document to be printed, or can be created and stored beforehand. For instance, in a further embodiment, the characteristics can collected from readers who have provided their characteristics voluntarily, or the characteristics of others, such as family members or friends, in response to active querying, or who have received incentives in exchange for their cooperation (operation 21), such as free printer toner or ink, paper, or other consumables. Similarly, profiles of users or groups of users can be built based on cookies that help track visits to Web sites of advertisers and others. Other activity tracking methods are possible.

Figure 3:
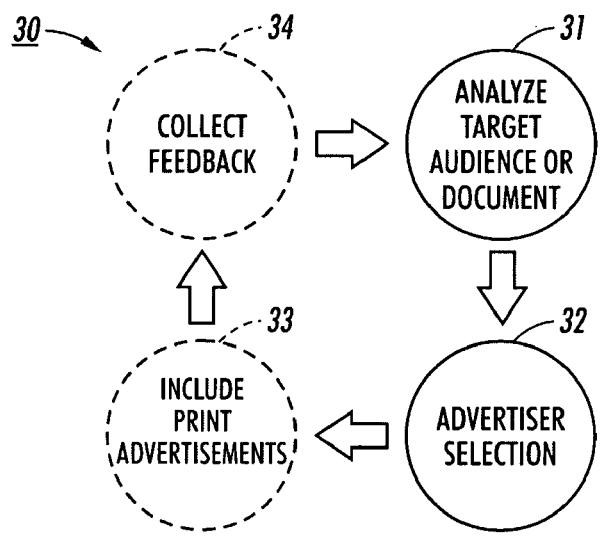
FIG. 3 is a process flow diagram showing advertising content targeting for use with the method of FIG. 2.

The advertising content, which is received from participating advertisers 13, is targeted to the target audience (operation 24), as further described with reference to FIG. 3, after which print advertising is included on the document produced (operation 25). When the advertising targeting and placement is performed for a fee, the electronic marketplace operator 14 employs a payment model to collect payment, as further described below with reference to FIGS. 13 and 14. The process is repeated for each new printing request.

Advertising Content Targeting

In general, the "targeting" of advertising encompasses the matching of potential print advertisements to the likely interests of the readers, which have been discerned from their known or presumed characterizes. The "placement" of advertising is simply the inclusion of targeted print advertisements on the physical hardcopy that is output by the printing device 11. FIG. 3 is a process flow diagram showing advertising content targeting 30 for use with the method 20 of FIG. 2. The print advertisements can include materials that have been previously created and stored, or can be drafted dynamically by participating advertisers 13 prior to targeting and placement.

If required, the characteristics of the target audience are first analyzed against advertising content or against preferences set by advertisers 13 (operation 31). The characteristics can originate from the document to be printed, such as by parsing keywords or concepts, or can be information previously provided by those readers who constitute a target audience. In a further embodiment, a document can include codes or other identifiers that specify the types of printed advertisements to include, exclude, or otherwise influence advertising targeting. Other sources of target audience characteristics are possible.

Similarly, the advertiser preferences can include keywords or target demographics, such as age group, region, subject matter, or other data that can be matched against the target audience characteristics. The advertiser preferences can also include time-based targeting considerations, such as the time of year, season, holidays, and so forth, as well as geographically-based targeting considerations, such as city, state, country, and the like. The advertising content can be actual print advertisements, keywords, term lists, or other data that characterize the goods or services being offered. The analysis can be through term matching, for instance, term frequency-inverse document frequency (tf-idf), or other data mining or analytic techniques. In a further embodiment, potential advertisers can indicate the types of document content that they are interested in targeting, or are able to select from a list of available document content types. Additionally, other forms of analysis and targeting are possible, such as analogously used for the targeting of advertising in Web content.

Analysis can help identify those advertisers 13 whose advertisements most appropriately match the characteristics of the target audience, after which one or more advertisers 13 can be selected (operation 32). In one embodiment, advertisers 13 compete against one another to select those winning advertisers whose advertising content will be placed. The competition can be transacted through direct competition between potential advertisers, such as by a live auction, as further described below with reference to FIG. 10, or by indirectly fielding offers from potential advertisers beforehand, as further described below with reference to FIG. 11. Other forms of inter-potential advertiser competition are possible.

In a further embodiment, advertisers 13 are selected on a non-competitive basis. For example, advertisers 13 can be picked on a first-come, first-served basis, or based on those advertisers 13 who are willing to pay a minimum threshold price for advertisement placement. Alternatively, advertisers 13 could be pre-selected, such as by prior arrangement or contract, or selected at random. Still other forms of advertiser selection are possible.

The print advertisements for the selected advertisers are included on the document (operation 33). The print advertising can either be placed supplemental to the document's content or as the document's primary content. For example, the print advertising could be placed in personal documents along the margins or as banner advertisements to avoid disturbing document layout, as further described below with reference to FIGS. 4 and 5. Alternatively, the print advertising can be placed wherever the document layout permits, as further described below with reference to FIGS. 6 and 7, or to serve a primary function within the document, such as in a mail order catalog, as further described below with reference to FIGS. 8 and 9. Other types of print advertising layout and placement are possible.

Finally, in a further embodiment, statistics on user-advertiser interactions and other types of feedback from users can be collected (operation 34) for post-advertisement targeting analysis, such as determining the effectiveness of the print advertisements or accuracy of advertising targeting. Consumers could be queried and profiled on whether they liked the advertising and would like to see more of that type, or to solicit comments and suggestions. The feedback can be used to improve further advertising targeting and placement or for other analyses.

Print Advertising Scenarios

The manner of targeting and physical placement of print advertising can vary by application. By way of examples, print advertising for individuals, social groups, and catalog sales is described, although other applications are possible.

Print Advertising for Individuals

Figure 4:
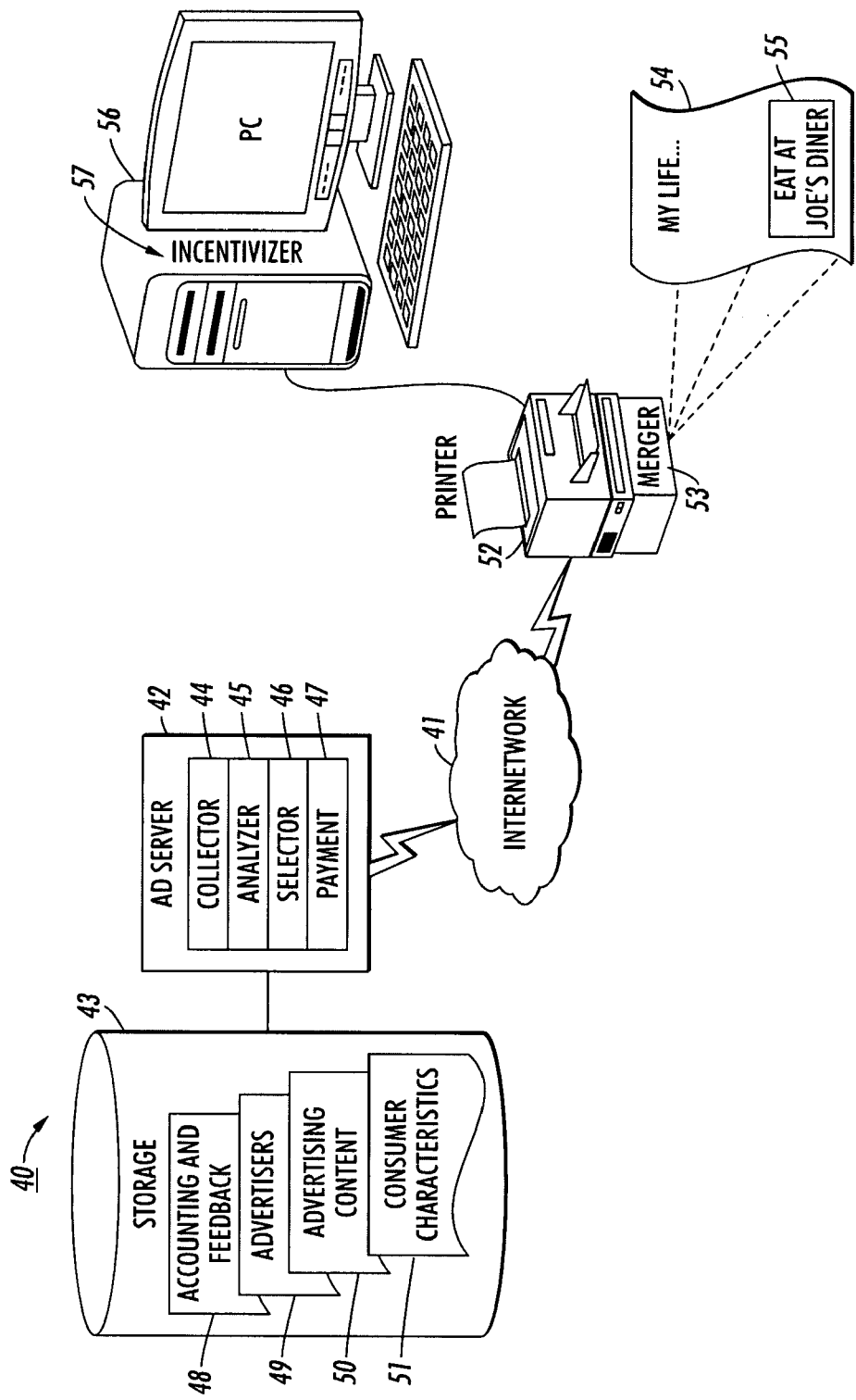
FIG. 4 is a functional block diagram showing a system for providing print advertisements for individuals in accordance with a further embodiment.

Conventionally, individuals have printed their documents in isolation from external inputs, while also generally bearing the costs of printing. FIG. 4 is a functional block diagram showing a system for providing print advertisements for individuals 40 in accordance with a further embodiment. Incentives are awarded to individuals in exchange for allowing advertisements to be targeted and placed on their documents. The individuals could be one person or a group of people who typically print documents from a printing device 11 without interfacing to any outside source.

Initially, a document 54 is written or created on a computing device 56, such as a personal computer, for eventual printing on a printing device 52. Alternatively, an existing document 54 or other form of printable content is selected. An incentivizer 57 runs on the computing device 56 to intercept each print request and prompt the individual to accept targeted print advertising on a hardcopy of their document. The incentivizer 57 incentives to the individual, or simply track acceptance of targeted advertising. Upon receiving a print request for the document 54, the computing device 56 notifies an advertising server 42 of the impending print request via an internetwork 41 or other form of interconnection. The notification can be sent in near real time, as a pre-cached exchange, or as an offline action. In a further embodiment, the printing device 52 can notify the advertising server 42, such as where the printing device 52 includes an intelligent network-connected print server capable of interfacing directly with a remote server. Other forms and originators of print request notification are possible.

The advertising server 42 includes storage 43, which can be a database or other form of structured data store. The storage 43 is used to store accounting and feedback data 48, advertisers 49, advertising content 50, and consumer characteristics 51, as well as other information. The advertising server 42 also includes four modules. A collector 44 gathers and stores the consumer characteristics 51 about potential readers, which can either be provided voluntarily or through incentives, such as free consumables. The collector 44 can also discover consumer characteristics 51 through data mining or analytic techniques that are performed on the document 54 or other data. Finally, the collector 44 can track and store statistics on user-advertiser interactions and other types of post-advertisement targeting data and feedback, which are tracked as a part of the accounting and feedback data 48. Other forms of feedback are possible.

The analyzer 45 evaluates the document content, consumer characteristics 51, or both against the advertising content 50 to identify matching print advertising. Where available, the analyzer 45 can also evaluate Web pages visited by the consumer, or previously generated or read documents. Other data sources for matching print advertising to consumers are possible. In a further embodiment, the advertiser 45 evaluates the suitability or relevancy of placing advertising content 50 in certain types of documents or for particular individuals or groups of users to avoid situations that could possible be offensive or otherwise inappropriate. For example, an environmental preservation group would likely have little interest in print advertisements for gas guzzling vehicles. The advertising content can also actively screened prior to acceptance by the electronic marketplace operator 14, or other party, either as part of advertising targeting and placement or offline. Other forms of advertising content evaluation or filtration are possible.

The selector 46 selects one or more advertisers 49 whose advertising content 55 will be placed. In one embodiment, a competition among those advertisers 49 corresponding to the matching print advertising is run, as further described below with reference to FIG. 10. The competition is run by either the advertising server 42 at the request of the selector 46, or by the selector 46 itself. In further embodiments, the advertisers 49 are selected by fielding offers beforehand, as further described below with reference to FIG. 11, or through other forms of competitive or non-competitive selection.

The advertising content 55 for the selected advertiser is merged into the individual's document by a merger module 53 on the printing device 52. The merger module 53 could also be on the advertising server 42 or the computing device 56. Finally, where applicable, the payment module 47 charges the selected advertisers for print advertising targeting and placement according to the applicable payment model or scheme. The collected payments are tracked as a further part of the accounting and feedback data 48. Other forms of accounting data are possible. Other stored data, modules, and functions are possible.

Figure 5:
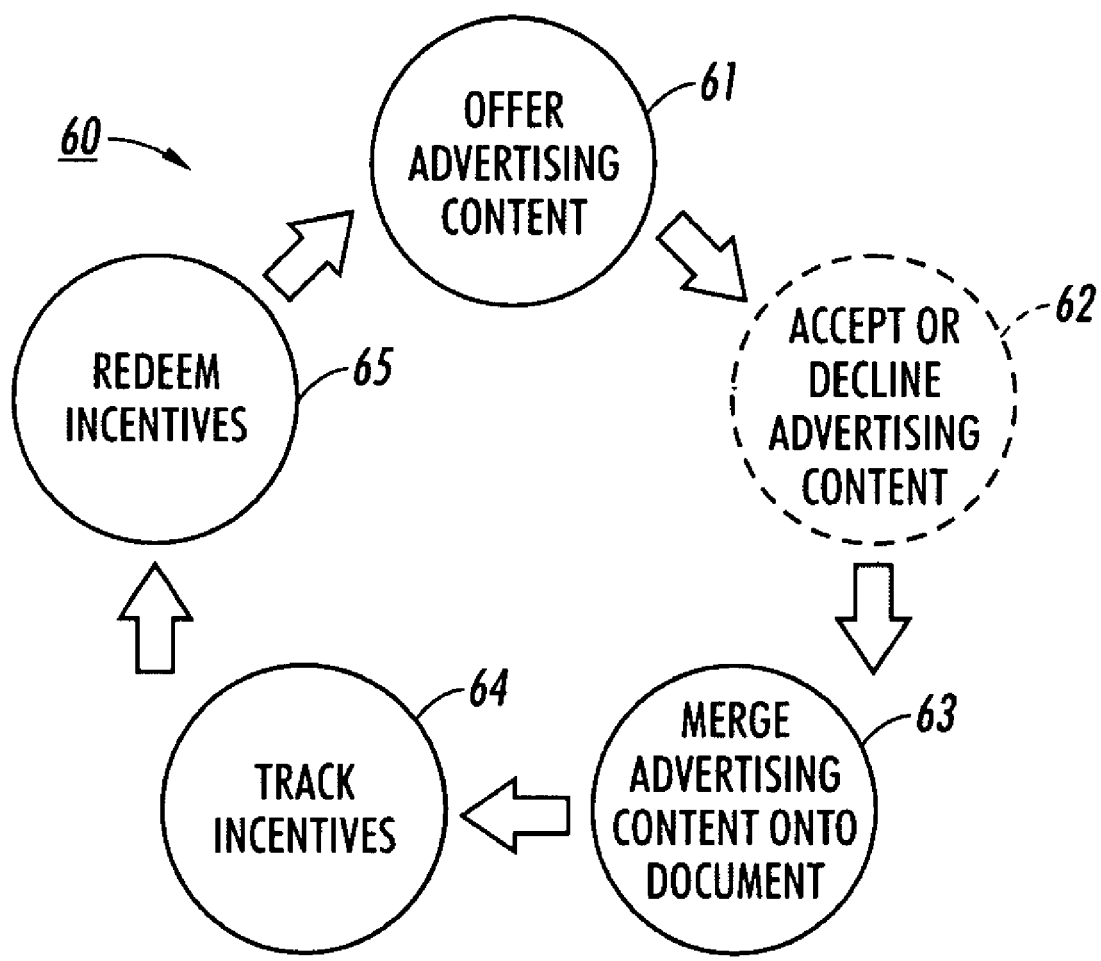
FIG. 5 is a process flow diagram showing a method for providing print advertisements for individuals in accordance with a further embodiment.

The advertising server 42 processes the print request through to print advertising targeting and placement by a series of operations. Referring now to FIG. 5, a process flow diagram of a method for providing print advertisements for individuals 60 in accordance with a further embodiment is shown. Advertising content is offered to the individual (operation 61) upon the initiation of a print job. The offer could be provided as an option on a printing control panel or by other user interface control. The individual can either accept (opt-in) or decline (opt-out) the inclusion of advertising content (operation 62). Acceptance of the offer tacitly allows the advertising server to determine consumer characteristics 51, which could be by parsing the document for keywords or concepts, or by requesting information from the reader. In a further embodiment, the individual can indicate his advertising content preferences beforehand, such as through a program option. In a still further embodiment, advertising content would be included by implication. For instance, in a public computing environment, such as a cyber café or computer lab, the use of a printer would imply acquiesce to having advertising content included on hardcopies. Other forms of opt-in or opt-out are possible.

The consumer characteristics 51 are analyzed to match suitable advertising content 50, which, following advertiser selection, is merged onto the document (operation 63). The chosen advertising content 55 can be placed in the margin or as a banner advertisement to avoid disturbing the document's content. However, other locations for print advertising placement are possible.

When provided, the advertising server 42 tracks incentives for participating readers (operation 64). The incentives could be points that earn credits for free consumables, such as printer toner or paper. Other forms of incentive awards are possible. Moreover, the incentives could be earned on a per-page printed basis, per print request, or per item of advertising content placed. Other forms of incentives are possible.

At some point, the reader can redeem the incentives (operation 64), which may be performed by the advertising server 42 automatically, such as where a reader has earned sufficient credits to receive an award, or upon demand of the reader, printing device, or computing device. Additionally, the redemption of incentives could be either in toto, whereby partial credits are disallowed, or on a pro-rata basis. For example, a reader might decide to redeem points that only quality for a partial award and the advertising server 42 would charge the reader for the cash difference for the portion of the award that is unearned. Other forms of incentive redemptions are possible. Other operations are also possible.

Print Advertising for Social Groups

Figure 6:
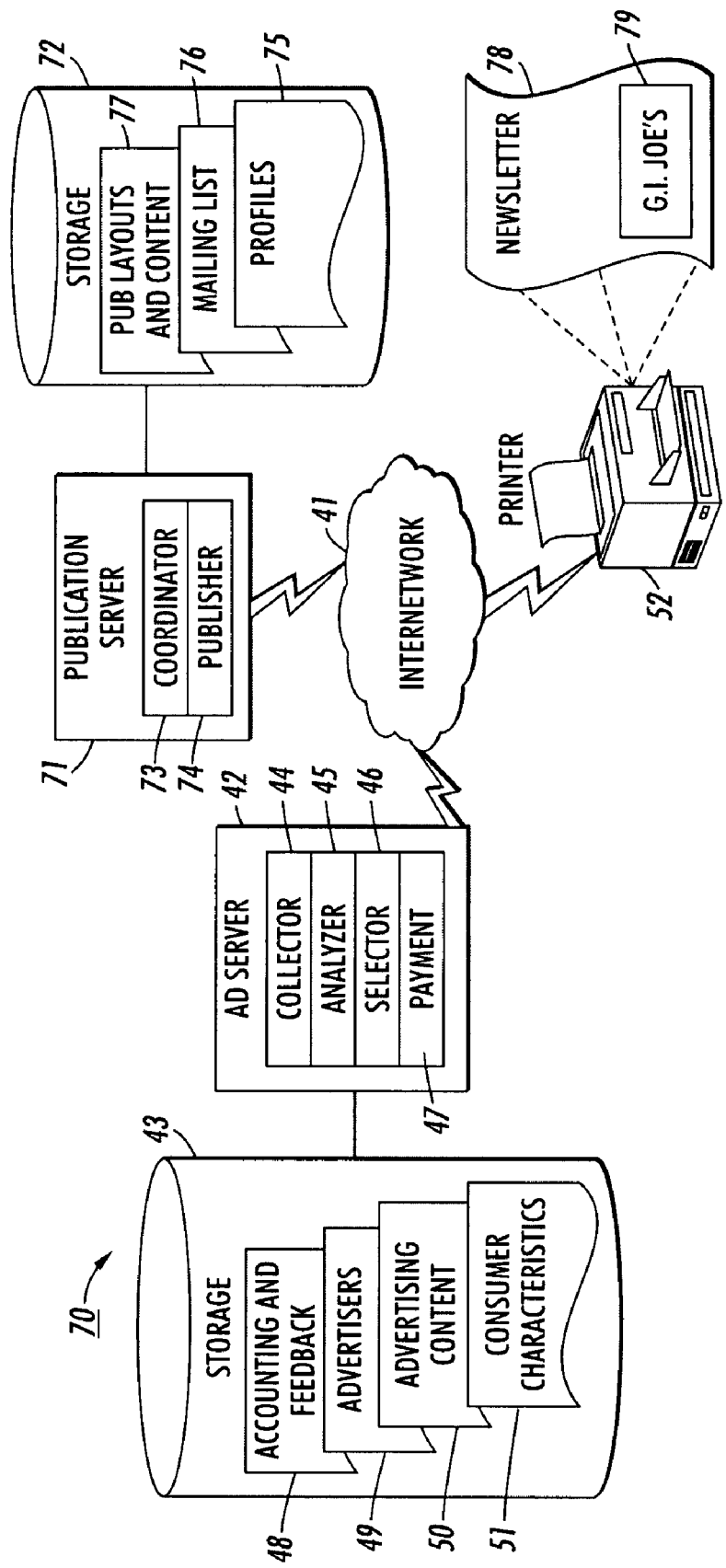
FIG. 6 is a functional block diagram showing a system for providing print advertisements for social groups in accordance with a further embodiment.

Social groups include both formal and informal sets of individuals who are organized to serve a common interest, goal, or group characteristic. Social groups include non-profit groups, such as clubs, teams, leagues, and other bodies, whose members are often demographically similar or engaged in pursuing a particular activity. Many social groups rely on a monthly newsletter to communicate with their membership, yet may not possess the resources to produce a quality newsletter. Moreover, a social group may lack the ability to attract advertisers or sponsors to support their activities, including newsletter production. FIG. 6 is a functional block diagram showing a system for providing print advertisements for social groups 70 in accordance with a further embodiment. Print advertisements are added to newsletters or other documents that are printed by a social group. The newsletters are produced in exchange for accepting targeted advertising and the social group provides the characteristics of their membership or individual members or affiliates for use in targeting the print advertisements. Other publications can also be produced.

Each newsletter 78 is the result of a collaborative process between a publication server 71 and the advertising server 42, which performs functions analogous to those operations performed for individuals, as further described above with reference to FIGS. 4 and 5. However, newsletter production need not be performed in real time, that is, between the time that a print request and physical printing occur.

The publication server 71 manages the creation and publishing of the newsletter 78 on the printing device 52. The publication server 71 includes storage 72, in which profiles 75, mailing lists 76, and publication layouts and content 77 are stored. The publication layouts are generally previously designed templates into which social group-provided content, targeted advertisements, and other content can be placed. The publication server 71 includes two modules. A coordinator 73 receives the profiles 75 and inputs to the newsletter 78 from the social group. The profiles 75 identify the purpose of the social group and related demographics that can be used in targeting advertising. The profiles 75 can also include personal information about the members, assuming proper permissions are secured beforehand. The coordinator 73 also stores a mailing list 76 that can be provided by the social group or built from the profiles 75. Finally, the publisher 74 generates the newsletter 78 from the social group-provided and other content and advertising content 79, which has been targeted in a manner similar to print advertising targeting for individuals.

Figure 7:
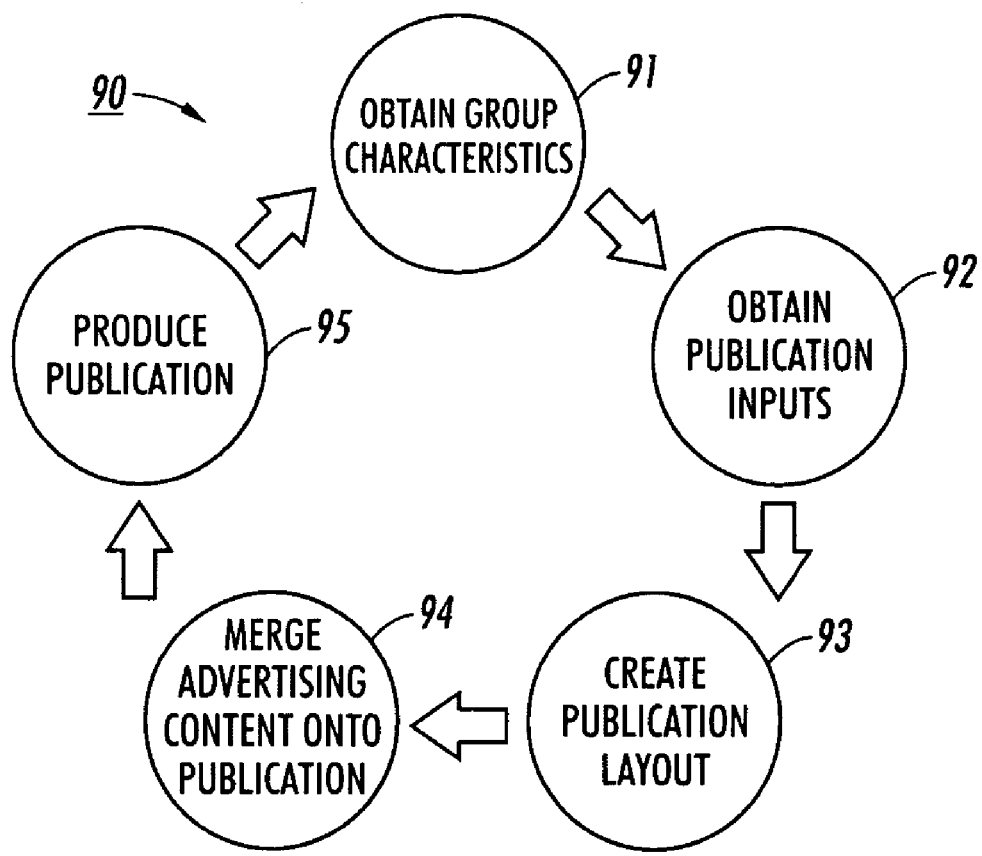
FIG. 7 is a process flow diagram showing a method for providing print advertisements for social groups in accordance with a further embodiment.

Ideally, the resulting newsletter 78 is of higher quality than would be otherwise generated by the social group by virtue of improved presentation quality and publication production. Referring now to FIG. 7, a process flow diagram of a method for providing print advertisements for social groups 90 in accordance with a further embodiment is shown. Characteristics of the social group 51 are first obtained by evaluating the profiles 75 (operation 91). The inputs to the newsletter or other publication are also obtained (operation 92). Based upon the nature of the newsletter and related factors, an appropriate layout and content are selected and assembled into a publication (operation 93). For instance, a social group may specify in their profile that they prefer single-sheet newsletters that can be tri-folded to minimize postage costs.

The group characteristics 51 are analyzed to match suitable advertising content 50, which, following advertiser selection, is merged onto the document (operation 94). The chosen advertising content 55 can be placed where allowed by the publication layout. Finally, the newsletter 78 is produced (operation 95), which is generally provided by the electronic marketplace operator 14 as a service to the social group for participating in the advertising program, although other incentives are possible. Other operations are also possible.

Print Advertising for Catalog Sales

Figure 8:
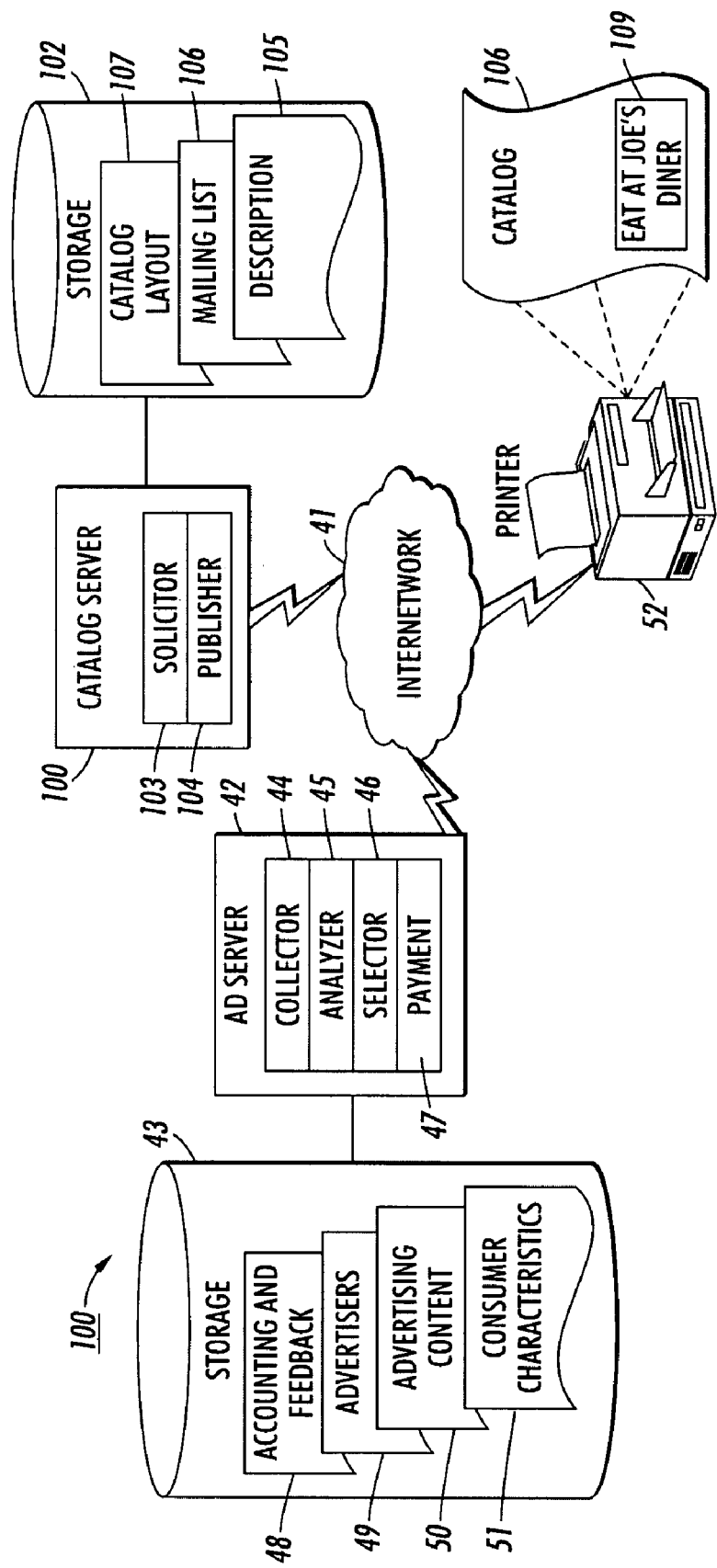
FIG. 8 is a functional block diagram showing a system for generating a catalog in accordance with a further embodiment.

From the perspective of a business, the decision to advertise or produce a catalog can turn on whether the expected benefits outweigh the anticipated costs. For a small business, advertising and catalog costs can be discouraging, particularly where the business is in competition with larger businesses who are better able to shoulder such costs. FIG. 8 is a functional block diagram showing a system for generating a catalog 100 in accordance with a further embodiment. Catalogs are produced through short printing runs for small merchants and similar concerns. The catalog contains actual products available for purchase, either through the mail or electronic means. Other publications can also be produced.

In a manner similar to newsletters, catalog production is the result of a collaborative process between a catalog server 101 and the advertising server 42, which performs functions analogous to those operations performed for individuals, as further described above with reference to FIGS. 4 and 5. However, catalog production also need not be performed in real time, that is, between the time that a print request and physical printing occur. Generally, each catalog is customized for small businesses and is populated with topical and targeted products from a collection of different merchants, who can be online or traditional "brick and mortar" merchants. Examples of possible catalog topics or themes include:

(1) Country or national interest, such as catalogs targeted to expatriated citizens with products from their home countries;
(2) "Lowest price guaranteed" products;
(3) "Unbelievable deals" products;
(4) Discount club catalogs;

(5) First purchase or visit club catalogs;
(6) Personal "style" products, such as trendy, hip, retro, classic, romantic, active, exotic, exclusive, and similar genre;
(7) "Green" catalogs, that is, catalogs containing natural and conservationist products;
(8) Interest groups, such as fly fishing, memorabilia collecting, and the like;
(9) Life events, such as wedding, birth, graduation, first home, and job search;
(10) Targeted catalogs tailored to individual profiles, which can use "cookies," Web browsing history data mining, or voluntarily provided information
(11) Gift finding catalogs containing products for family, friends, and colleagues, which are based on profiles for those individuals, rather than for the gift giver him or herself;
(12) Catalogs based on "classic" demographics, that is age, profession, income, similar widely accepted markers; and
(13) Locally-targeted catalog for local businesses or online collaborative classified advertisers, such as Craigslist.

Other Topics and Themes are Possible.

The catalog server 101 manages the creation and publishing of a catalog 108 on the printing device 52. The catalog server 101 includes storage 102, in which descriptions 105, mailing lists 106, and catalog layouts 107 are stored. The catalog server 101 includes two modules. A solicitor 103 receives the descriptions 105 from participating businesses. The descriptions 105 identify the goods or services, or other information to be included in the catalog 108 as the advertising content 50. The solicitor 103 also stores a mailing list 106 that can be provided by the participating business. Finally, the publisher 74 generates the catalog 108 from the advertising content 109, which has been targeted in a manner similar to print advertising targeting for individuals.

Figure 9:
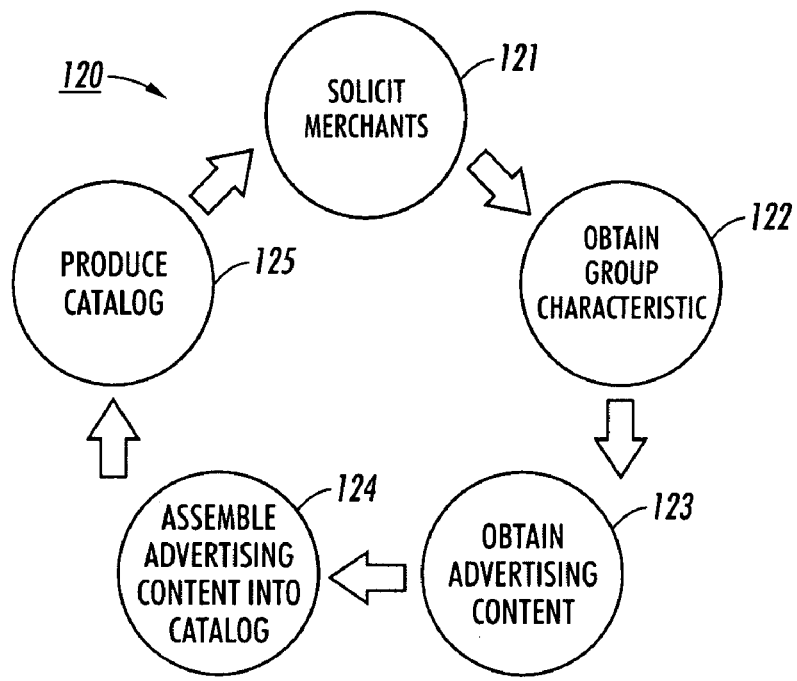
FIG. 9 is a process flow diagram showing a method for providing print advertisements for catalog sales in accordance with a further embodiment.

The catalog 106 is created at lower cost to each participating business and the costs of production are indirectly recouped by the electronic marketplace operator 14 through application of a payment model, rather than by direct payment. Referring now to FIG. 9, a process flow diagram of a method for providing print advertisements for catalog sales 120 in accordance with a further embodiment is shown. In general, catalog production is geared towards small business that would otherwise find catalog advertising unaffordable. Thus, individual merchants, such as small online businesses catering to the interests of a specific target group, are solicited for participation (operation 121). Target audience characteristics are obtained by evaluating the consumer characteristics 51 maintained by the advertising server 42 (operation 122). Advertising content and other information matching the consumer characteristics 51 of the intended target audience are obtained from participating businesses (operation 123) and assembled into the catalog (124). Finally, the catalog 108 is produced (operation 105). Other operations are also possible.

Inter-Potential Advertiser Competitions

Advertising space, particularly on a printed document, is generally limited. One approach to selecting advertisers is by allowing potential advertisers to compete for available advertising space, which can be performed on a per-page, per-document, per-consumer, or other basis. By way of examples, two forms of inter-potential advertiser competition are described, although other forms of advertising space competition are possible.

Figure 10:
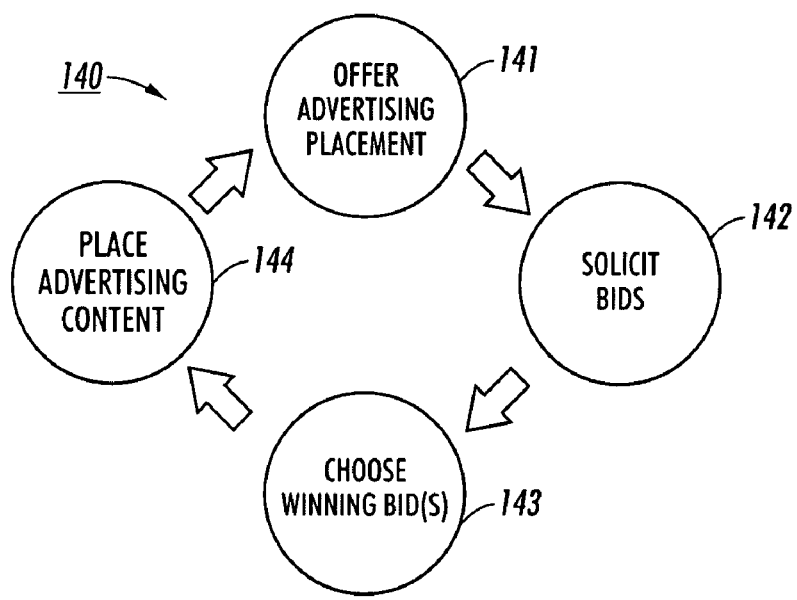
FIG. 10 is a process flow diagram showing advertiser selection using an auction format for use with the method of FIG. 3.

From the viewpoint of the electronic marketplace operator 14, revenue can be enhanced by tying the winning of a competition to a price point. FIG. 10 is a process flow diagram showing advertiser selection using an auction format 140 for use with the method 30 of FIG. 3. Individual advertisers directly compete against each other by placing electronic "bids" that represent the amount that they are willing to pay for print advertising placement and the highest amount wins. Other ways to select a winning advertiser based on bids or other advertiser inputs are possible.

The competition begins with the offer of print advertising placement (operation 141). For efficiency, the offer can be made only after performing targeting to ensure that advertisers with proposed advertising that does not match the targeted characteristics compete. Bids are solicited (operation 142) and the winning bid or, in a further embodiment, bids are chosen (operation 143). The winning bid can be the highest bid, highest bid averaged over a range of bids, first bid to exceed a minimum bid threshold, or by any other criteria sufficient to identify a winner. Finally, the advertising content for the winning bidder is placed (operation 144). Other operations are also possible.

Figure 11:
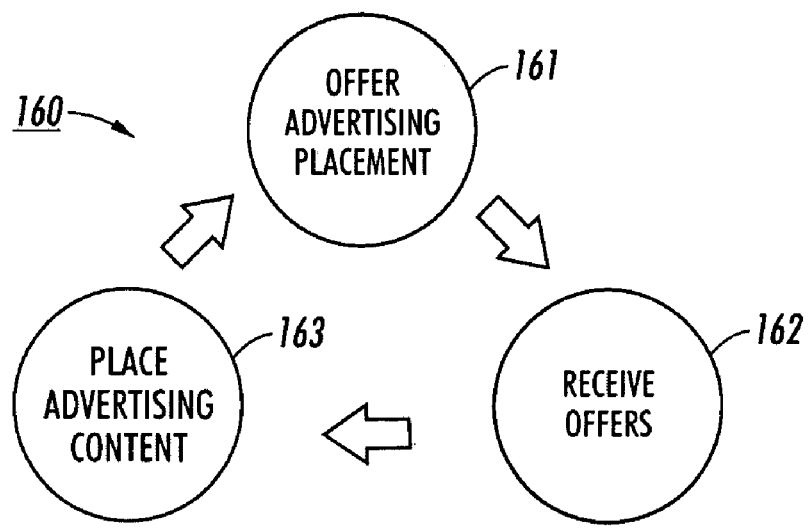
FIG. 11 is a process flow diagram showing advertiser selection using a directed inquiry format for use with the method of FIG. 3.

From the viewpoint of a potential advertiser, certainty can be assured by guaranteeing print advertising placement through offer-and-acceptance. FIG. 11 is a process flow diagram showing advertiser selection using a directed inquiry format 160 for use with the method 30 of FIG. 3. Individual advertisers "compete" indirectly by winning their selection for advertising placement by the electronic marketplace operator 14.

As with an active auction, described above, the competition begins with the offer of print advertising placement (operation 161). Offers are received (operation 142), which can be an agreement to pay a prearranged amount for advertising placement, minimum number of advertisements to be placed, or by any other criteria sufficient to entice the electronic marketplace operator 14 to agree to place that advertiser's advertising content. Finally, the advertising content is placed (operation 144). Other operations are also possible.

Advertiser Payment Models

At one extreme, advertising targeting and placement can be performed for a fee, where selected advertisers are generally expected to pay for their advertising, unless other arrangements with the electronic marketplace operator 14 are applicable. At the other extreme, no fee is charged and targeting, placement, and other publication-related services are provided for free or nominal charge. In between these extremes, pricing and payment models can include fixed or variable pricing schemes, such as where a price can change based on exclusivity, events, urgency, advertising size, circulation, impressions, layout, color or grayscale, and other factors. Additionally, advertisers can be charged on a pay-per-referral, pay-per-purchase, pay-per-conversion, pay-per-action, pay-per-print, or pay-when-printed basis, as when a print advertisement is triggered from an email or other online document or feature. Still further pricing and payment models are possible.

Figure 12:
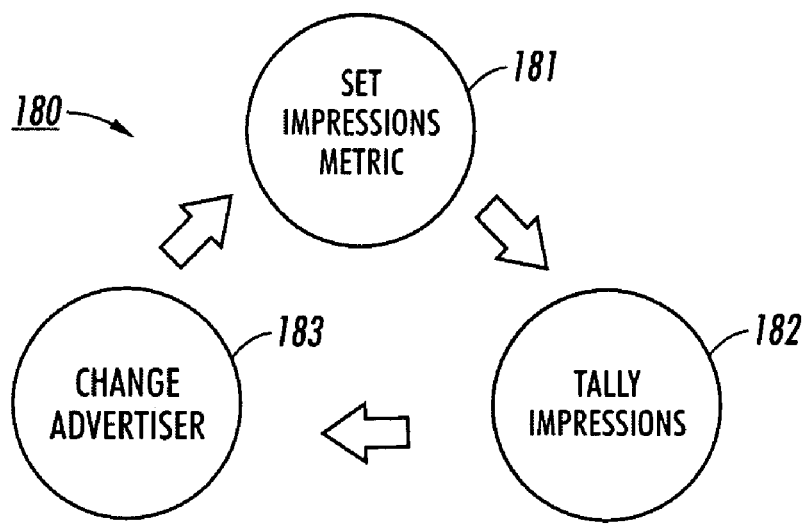
FIG. 12 is a process flow diagram showing a payment model based on print impressions for use with the method of FIG. 2.

With Web-based targeted advertising, the effectiveness of placed advertisements can be tracked through hyperlinked advertising referrals. However, similar tracking mechanisms are not generally available for hardcopy, except, for instance, during printing preview or other computing device operations. As a result, payment models need to be more generalized. For example, payment for conventional print advertising generally follows an impressions-based payment model. FIG. 12 is a process flow diagram showing a payment model based on print impressions 180 for use with the method 20 of FIG. 2. An impression is a fixed number of hardcopies.

Prior to undertaking the targeting and placement of print advertising, the electronic marketplace operator 14 sets a metric for determining the number of impressions necessary to trigger payment (operation 181). The impression metric is tied to the number of publications upon which the advertiser's advertising content is actually placed, although other impression metrics are possible. Thereafter, the number of impressions is tallied (operation 182) and the advertiser is charged for the print advertising when the impression metric is reached (operation 183). Other forms of impression-based payment are possible.

Figure 13:
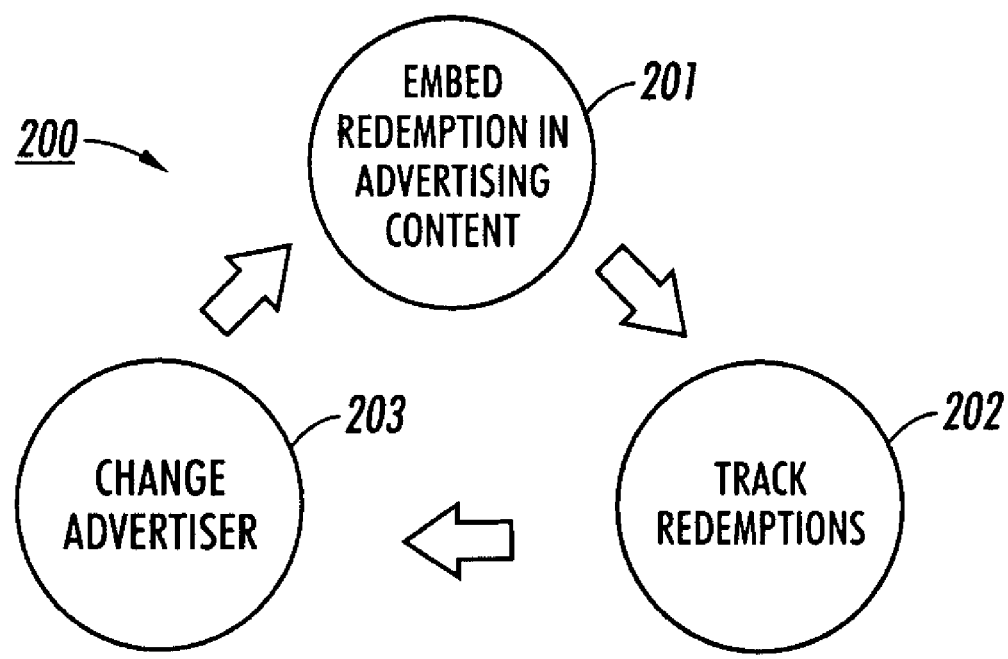
FIG. 13 is a process flow diagram showing a payment model based on advertising redemptions for use with the method of FIG. 2.

As an incentive to potential advertisers, the recoupment of compensation for print advertising placement can be deferred until when, and if, their advertising creates results. FIG. 13 is a process flow diagram showing a payment model based on advertising redemptions 200 for use with the method 20 of FIG. 2. For printed advertising by purely hardcopy means, linking a particular print advertisement to a consumer purchase can be speculative without quantifiable results that can be tied to an action by the consumer.

Thus, one approach to enable quantification of advertising results relies on a redemption that is embedded with the print advertisement (operation 201). The actual redemption need not be transacted through the computing or printing devices used to create and produce the hardcopy, but could be via a separate device, such as another computing or printing device, cellular telephone, handheld digital assistant, gaming console, or other devices capable of interfacing directly or indirectly over a network.

A redemption can be a physically printed coupon, discount code, or pre-made identifier that can be redeemed through conventional mail or facsimile, which can be in the form of a peel-off sticker, barcode, or other form of encoding capable of being scanned or electronically read and interpreted. A redemption can also be digital, for instance, by rendering a hyperlink or other identifier for user click-through selection during printing preview or other phases. Hyperlinks can be customized for particular social groups or consumers, such as available through Uniform Resource Locator (URL) aliasing services like TinyURL. Alternatively, hyperlinks could provide access to special advertiser Web sites, or portals for those advertisers who lack a Website. Users could be offered a range of features, including order placement and fulfillment, and would enable the electronic marketplace operator and advertisers to track live demographics, performance, and other statistics related to advertising campaigns. Finally, a redemption could be a consumer-generated facsimile of the print advertisements, which can be sent in to advertisers or sponsors for redemption, for instance, by scanning, digital photograph, bar code scan, text messaging, and similar means.

In a further embodiments, redemptions can be enhanced by providing consumers with an additional discount or other incentive when advertisers are reached through the targeted advertising. Other forms of redemption are possible. Each redemption by a consumer is tracked (operation 202), after which the advertiser is charged for the print advertising (operation 203). Other forms of redemption-based payment are possible.

While the invention has been particularly shown and described as referenced to the embodiments thereof, those skilled in the art will understand that the foregoing and other changes in form and detail may be made therein without departing from the spirit and scope.

What is claimed is:

1. A system for providing print advertisements, comprising:
    a database to assemble a target audience in a storage, wherein members of the target audience are either an individual or part of a social group of demographically similar individuals who are engaged in pursuing a common activity, and to store characteristics of each member of the target audience obtained for the expressed purpose of targeting advertising to that member;
    an advertising server to target advertising content to the target audience, comprising:
        a selector to retrieve from the storage the advertising content comprising advertisements provided by one or more potential advertisers;
        an analyzer to match the characteristics of the target audience using the processor against the advertising content and ranking the potential advertisers based on the matchings of their advertising content, wherein the selector selects at least one of the top ranked potential advertisers;
        a merger to select one or more advertisements using the processor for the selected advertiser; and
        an incentivizer to intercept a print request for a document that was initiated by the target audience from a private printing device available for local printing only by the members of the target audience and to prompt the target audience for inclusion of the selected advertisements, wherein the merger includes the selected advertisements upon receipt of an acceptance by the target audience with other content on the document; and
    an output device to physically print the document on the printing device to the members of the target audience.

2. A system according to claim 1, wherein the print advertisements are placed between a printing request for and printing of the document.

3. A system according to claim 1, further comprising:
    a payment module to apply a payment model to recoup compensation for inclusion of the print advertisements from the selected advertiser.

4. A system according to claim 1,
    wherein the incentivizer further incentivizes readers to make characteristics about themselves available.

5. A system according to claim 1, wherein layout and printing services are provided as incentives to the target audience to reveal the characteristics of the readers who comprise that target audience.

6. A system according to claim 5, wherein the readers comprises the target audience as a social group whose members each share at least one of the characteristics in common.

7. A system according to claim 1, wherein remuneration is provided to a publisher of the document as recompense for inclusion of the print advertisements on the document.

8. A system according to claim 1, further comprising:
    an auction server to run an auction between a plurality of the potential advertisers as the competition, wherein at least one of the potential advertisers who present a winning bid in the auction is selected.

9. A system according to claim 1, wherein the document is selected from a group comprising books, periodicals, magazines, catalogs, newsletters, documents, and writings, further comprising:
    an evaluator to determine the print advertisements for placement in the document through the characteristics.

10. A system according to claim 1, wherein the characteristics are obtained from each reader by either actively querying the reader or passively collecting the characteristics from the reader.

11. A system according to claim 1, further comprising:
    a filter to filter the advertising content against the characteristics of the target audience for appropriateness.

12. A system according to claim 1, further comprising:
a direct compensation payment model applied by paying compensation to an electronic marketplace based on publication of the document.

13. A system according to claim 12, wherein a commission is paid to a publisher of the document in exchange for the inclusion of the print advertisements.

14. A system according to claim 12, wherein the compensation is determined as a function of a number of the documents that are either distributed or printed.

15. A system according to claim 1, further comprising:
an indirect compensation payment model applied by paying compensation to an electronic marketplace at a time of redemption of the print advertisements by one or more of the readers in the target audience.

16. A system according to claim 15, wherein the redemption is selected from a group comprising a printed coupon, discount code, pre-made identifier, and Uniform Resource Locator.

17. A system according to claim 1, further comprising:
an online advertising server to provide Web-based targeting of the advertising content to the target audience in addition to the print advertisements.

18. A computer-implemented method for providing print advertisements, comprising:
assembling a target audience into a database in a storage using a processor wherein members of the target audience are either an individual or part of a social group of demographically similar individuals who are engaged in pursuing a common activity;
obtaining characteristics of each member of the target audience for the expressed purpose of targeting advertising to that member, wherein the characteristics are kept in the storage;
retrieving from the storage advertising content comprising advertisements provided by one or more potential advertisers;
targeting using the processor the advertising content to the target audience, comprising:
matching the characteristics of the target audience using the processor against the advertising content and ranking the potential advertisers based on the matchings of their advertising content;
selecting using the processor at least one of the top ranked potential advertisers; and
selecting one or more advertisements using the processor for the selected advertiser;
intercepting a print request for a document that was initiated by the target audience from a private printing device available for local printing only by the members of the target audience;
prompting the target audience for inclusion of the selected advertisements and including the selected advertisements using the processor upon receipt of an acceptance by the target audience with other content on the document; and
physically printing the document on the printing device to the members of the target audience.

19. A computer-implemented method according to claim 18, further comprising:
placing the print advertisements using the processor between a printing request for and printing of the document.

20. A computer-implemented method according to claim 18, further comprising:
applying a payment model using the processor to recoup compensation for inclusion of the print advertisements from the selected advertiser.

21. A computer-implemented method according to claim 18, further comprising:
incentivizing readers using the processor to make characteristics about themselves available.

22. A computer-implemented method according to claim 18, further comprising:
providing layout and printing services using the processor as incentives to the target audience to reveal the characteristics of the readers who comprise that target audience.

23. A computer-implemented method according to claim 22, wherein the readers comprises the target audience as a social group whose members each share at least one of the characteristics in common.

24. A computer-implemented method according to claim 18, further comprising:
providing remuneration using the processor to a publisher of the document as recompense for inclusion of the print advertisements on the document.

25. A computer-implemented method according to claim 18, further comprising:
running an auction using the processor between a plurality of the potential advertisers as the competition; and
selecting using the processor at least one of the potential advertisers who present a winning bid in the auction.

26. A computer-implemented method according to claim 18, wherein the document is selected from a group comprising books, periodicals, magazines, catalogs, newsletters, documents, and writings, further comprising:
determining the print advertisements using the processor for placement in the document through the characteristics.

27. A computer-implemented method according to claim 18, further comprising:
obtaining using the processor the characteristics from each reader by either actively querying the reader or passively collecting the characteristics from the reader.

28. A computer-implemented method according to claim 18, further comprising:
filtering the advertising content using the processor against the characteristics of the target audience for appropriateness.

29. A computer-implemented method according to claim 18, further comprising:
applying a direct compensation payment model using the processor by paying compensation to an electronic marketplace based on publication of the document.

30. A computer-implemented method according to claim 29, further comprising:
paying a commission to a publisher of the document using the processor in exchange for the inclusion of the print advertisements.

31. A computer-implemented method according to claim 29, further comprising:
determining the compensation using the processor as a function of a number of the documents that are either distributed or printed.

32. A computer-implemented method according to claim 18, further comprising:
applying an indirect compensation payment model using the processor by paying compensation to an electronic marketplace at a time of redemption of the print advertisements by one or more of the readers in the target audience.

33. A computer-implemented method according to claim 32, wherein the redemption is selected from a group comprising a printed coupon, discount code, pre-made identifier, and Uniform Resource Locator.

34. A computer-implemented method according to claim 18, further comprising:
providing Web-based targeting of the advertising content using the processor to the target audience in addition to the print advertisements.

35. A computer-readable storage medium holding code for performing the computer-implemented method according to claim 18.

36. An apparatus for providing print advertisements, comprising:
means for assembling a target audience into a database in a storage using a processor wherein members of the target audience are either an individual or part of a social group whose members are of demographically similar individuals who are engaged in pursuing a common activity;
means for obtaining characteristics of each member of the target audience for the expressed purpose of targeting advertising to that member, wherein the characteristics are kept in the storage;
means for retrieving from the storage advertising content comprising advertisements provided by one or more potential advertisers;
means for targeting using the processor the advertising content to the target audience, comprising:
means for matching the characteristics of the target audience using the processor against the advertising content and ranking the potential advertisers based on the matchings of their advertising content;
means for selecting using the processor at least one of the top ranked potential advertisers; and
means for selecting one or more advertisements using the processor for the selected advertiser;
means for intercepting a print request for a document that was initiated by the target audience from a private printing device available for local printing only by the members of the target audience;
means for prompting the target audience for inclusion of the selected advertisements and means for including the selected advertisements using the processor upon receipt of an acceptance by the target audience with other content on the document; and
means for physically printing the document on the printing device to the members of the target audience.

* * * * *